(12) United States Patent
Waterman et al.

(10) Patent No.: US 6,448,742 B1
(45) Date of Patent: Sep. 10, 2002

(54) LOW PROFILE BATTERY PACK WITH AIRCRAFT POWER PROVISIONS

(75) Inventors: Michael D. Waterman, Chandler, AZ (US); David W. Buck, Mesquite, TX (US); Terry D. Morris, Buckeye, AZ (US); James G. Winkel, Rockwall; David A. Crosby, Rowlett, both of TX (US)

(73) Assignee: Litton Systems, Inc., Los Angeles, CA (US)

( * ) Notice: Subject to any disclaimer, the term of this patent is extended or adjusted under 35 U.S.C. 154(b) by 0 days.

(21) Appl. No.: 09/784,298

(22) Filed: Feb. 15, 2001

(51) Int. Cl.[7] .............................................. H01M 10/46
(52) U.S. Cl. ..................................................... 320/114
(58) Field of Search ................................. 320/107, 112, 320/114, 115

(56) References Cited

U.S. PATENT DOCUMENTS 5,683,831 A    11/1997  Baril et al.
6,081,094 A     6/2000  Crenshaw et al.

*Primary Examiner*—Edward H. Tso
(74) *Attorney, Agent, or Firm*—Marsteller & Associates, P.C.

(57) ABSTRACT

A transportable power source (P) for an image viewing device (D) includes a battery pack housing assembly (10) to internally hold a first battery pack (12). An electrical interface circuit (14) receives an input voltage level (16) and provides a resulting output voltage level (18) as an output therefrom to operate the viewer device (D). The interface circuit (14) receives a selected first input voltage level (20) from the first battery pack (12). Alternatively, the interface circuit (14) receives a selected second input voltage level (22) from a power supply source (S) external to the battery pack housing (10). The interface circuit (14) further includes a switch (24) for selecting between sources of input voltage levels from among at least the first input voltage level (20) and the second input voltage level (22). The switch (24) also selectively controls the source for the resulting output voltage level (18).

13 Claims, 6 Drawing Sheets

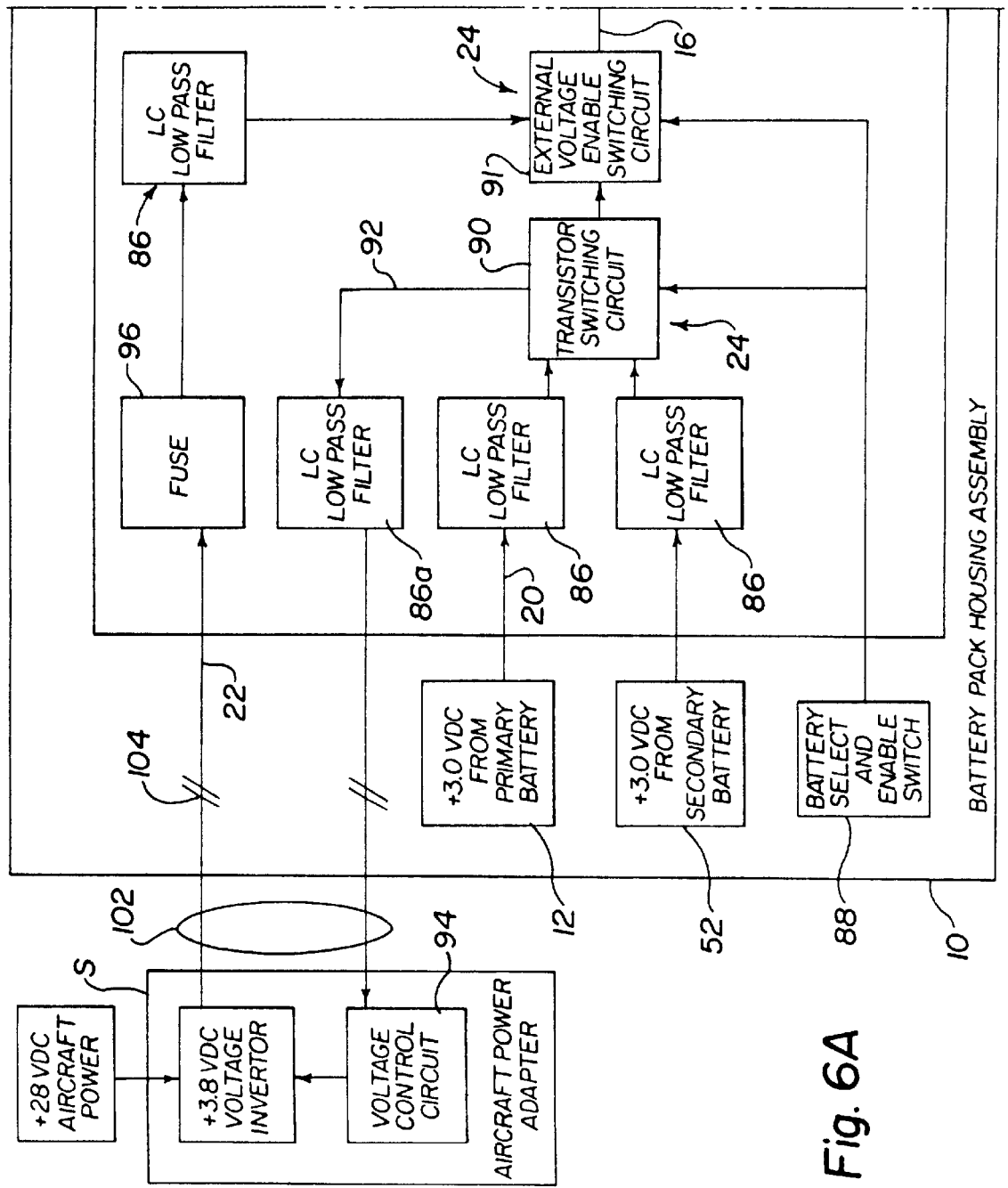

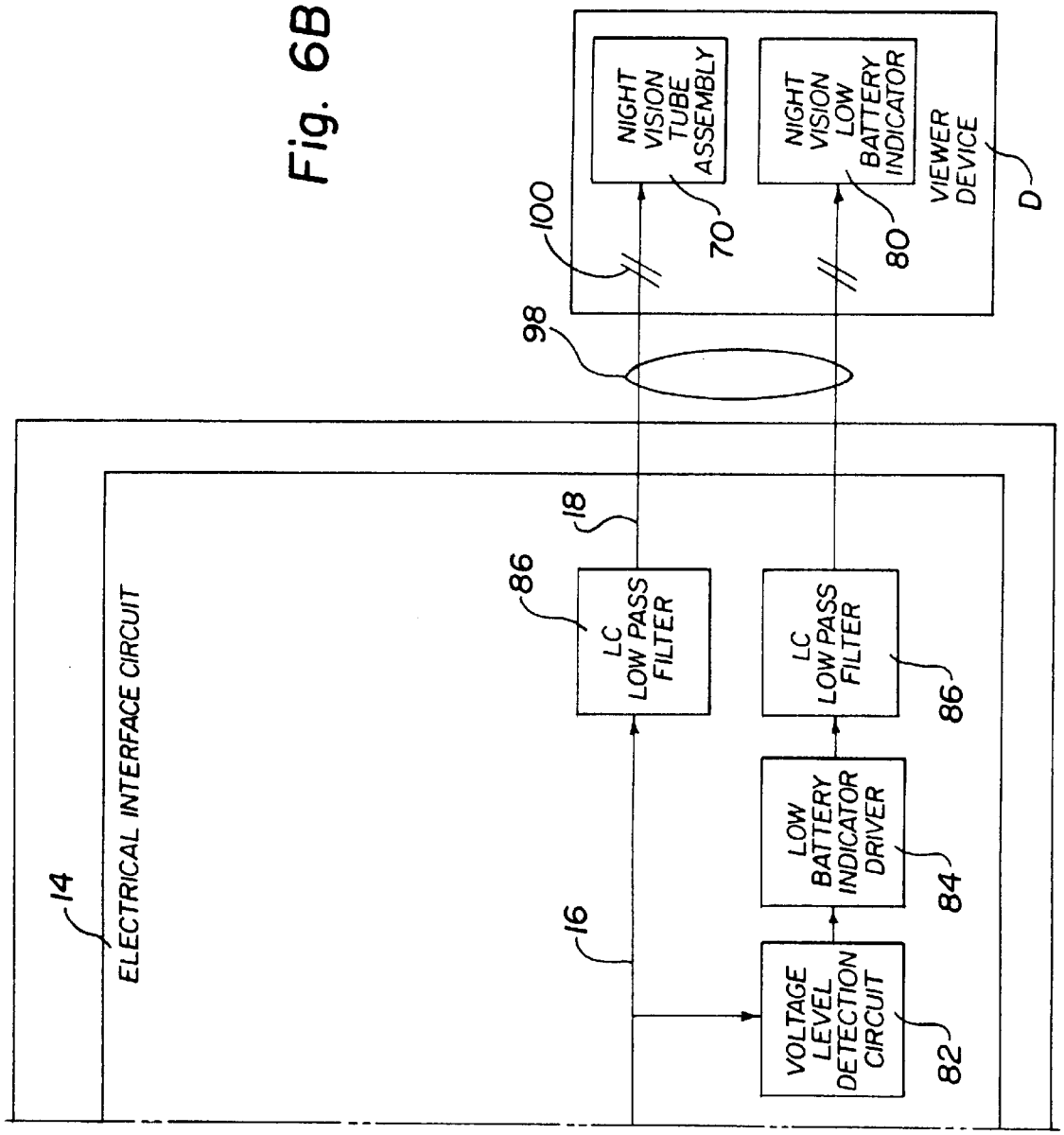

LOW PROFILE BATTERY PACK WITH AIRCRAFT POWER PROVISIONS

BACKGROUND OF THE INVENTION

1. Technical Field

The invention relates to the field of power supplies for image viewing devices, and more particularly to an improved battery and external power supply pack for a helmet mounted night viewer.

2. Background Art

Image viewing devices, such as image intensifier night vision goggles, are used generally by members of the military as well as others for detecting or sensing images of a scene. Such image viewers typically require a power source to provide power for the included electrical circuitry. For certain types of image viewers, such as an ANVIS type of night vision goggle that is attached to the front of an aviator's helmet, SPH-4 for instance, it is preferred that the power supply or source be remotely mounted from the image viewer. Remotely mounting the comparatively heavy power supply somewhat relieves tension on the neck of the operator. Known types of separate power sources are disclosed in U.S. Pat. Nos. 5,683,831 and 6,081,094, for example.

However, such a known reduced size or compact battery pack has not included a provision for power from the external aircraft power sources. There are numerous reasons for this nonuse of the aircraft power supply, such as the reduction of weight and size savings.

While the above cited references introduce and disclose a number of noteworthy advances and technological improvements within the art, none completely fulfills the specific objectives achieved by this invention.

DISCLOSURE OF INVENTION

In accordance with the present invention, a transportable power source for an image viewing type device includes a battery pack housing assembly to internally hold a first battery pack. An electrical interface circuit receives an input voltage level and provides a resulting output voltage level as an output therefrom to operate the viewer device. The electrical interface circuit is adapted to receive a selected first input voltage level from the first battery pack. The electrical interface circuit is adapted to receive a selected second input voltage level from a power supply source external to the battery pack housing. The electrical interface circuit further includes a switch for selecting between sources of input voltage levels from among at least the first input voltage level from the battery pack and the second input voltage level from the power supply source that is external to the battery pack housing assembly. The switch also is used to selectively control the source for the resulting output voltage level from the battery pack housing assembly.

Preferably, the battery pack housing assembly is adapted to conform to an exterior surface of the helmet, such as a military aviator's or other ballistic impact protection types of helmets. A support may also be included for attaching the battery pack housing assembly to the exterior surface of the helmet.

These and other objects, advantages and features of this invention will be apparent from the following description taken with reference to the accompanying drawings, wherein is shown the preferred embodiments of the invention.

BRIEF DESCRIPTION OF DRAWINGS

A more particular description of the invention briefly summarized above is available from the exemplary embodiments illustrated in the drawing and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

FIGS. 6A, 6B and 6 are a schematic block diagram including the electrical interface circuit.

MODE(S) FOR CARRYING OUT THE INVENTION

Figure 1:
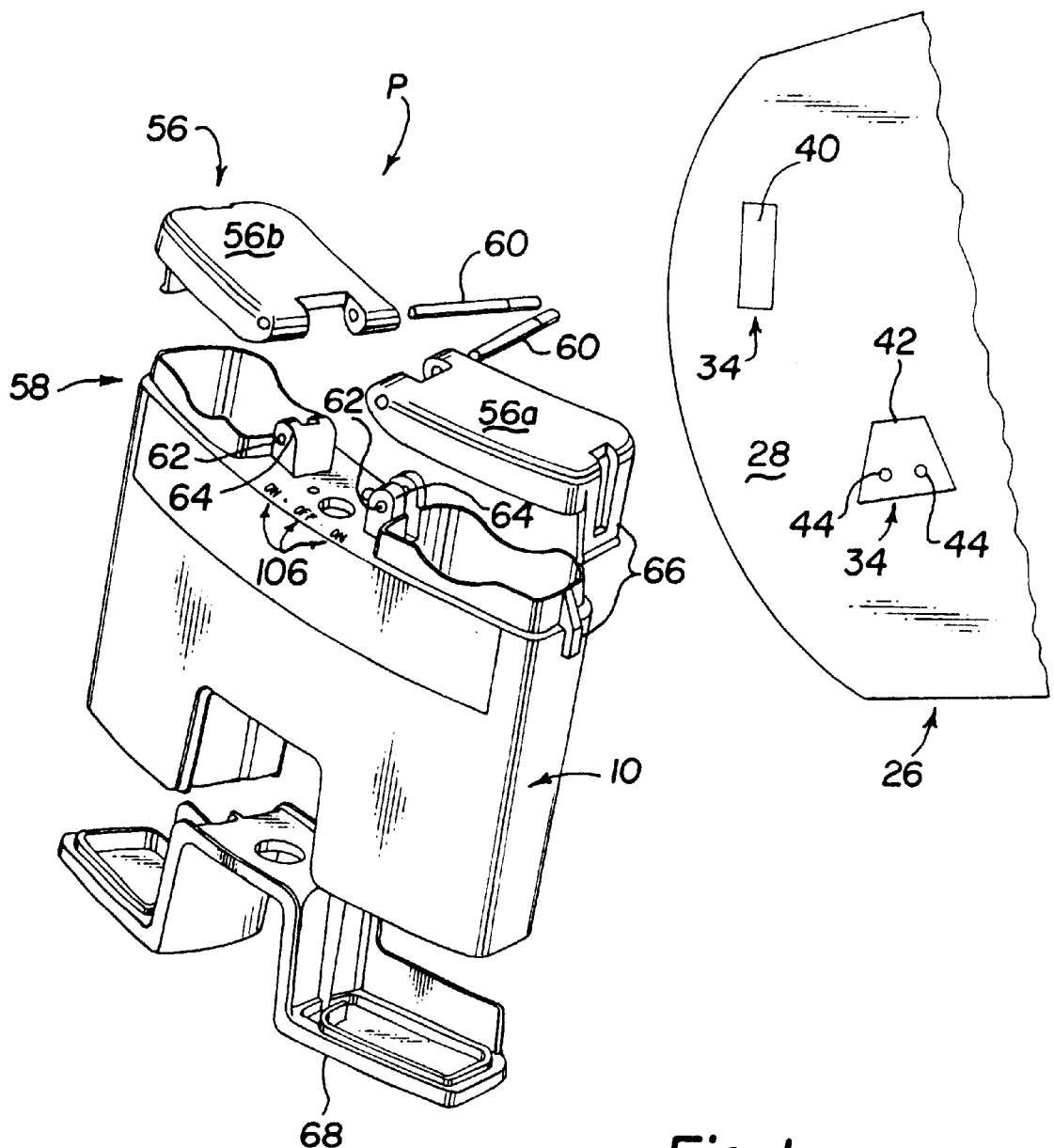
FIG. 1 is an exploded, right front isomeric view of the battery pack housing assembly of the present invention having the removable battery covers open.
Figure 2:
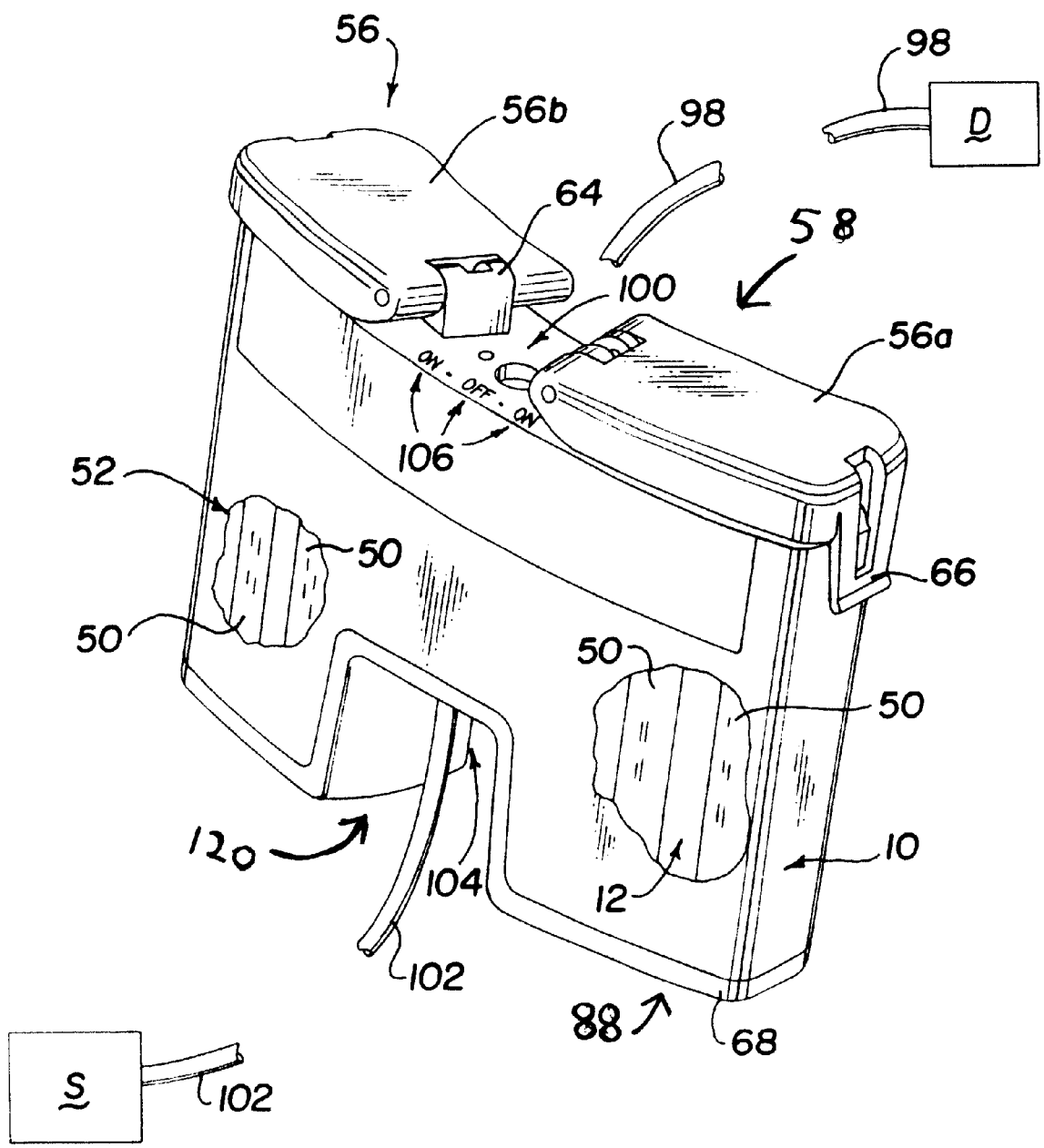
FIG. 2 is another right front isomeric view of the battery pack housing assembly having the removable battery covers secured.
Figure 3:
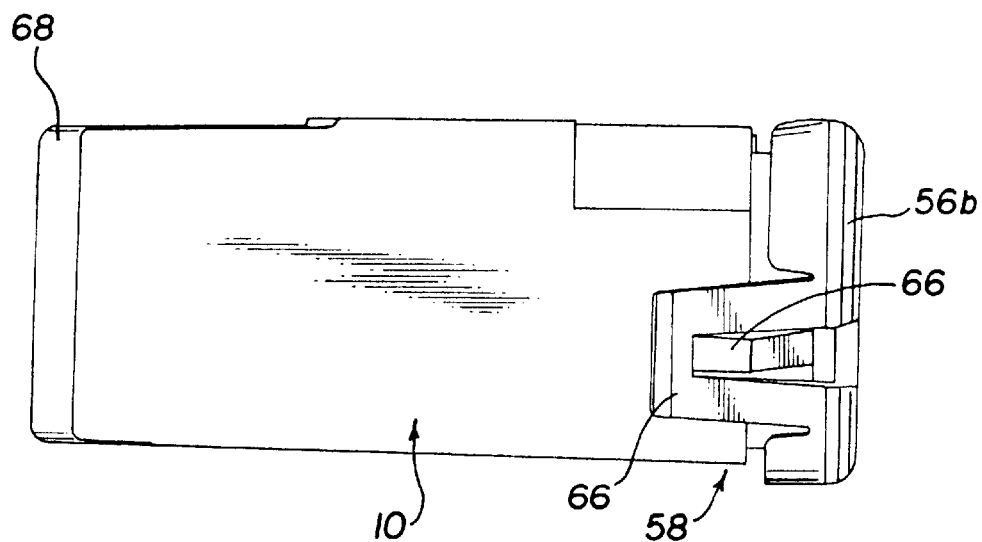
FIG. 3 is a right side view of the battery pack housing assembly.

So that the manner in which the above recited features, advantages and objects of the present invention are attained can be understood in detail, more particular description of the invention, briefly summarized above, may be had by reference to the embodiment thereof that is illustrated in the appended drawings. In all the drawings, identical numbers represent the same elements.

A transportable power source (P) for an image viewing type device (D) includes a battery pack housing assembly (10) to internally hold a first battery pack (12). An electrical interface circuit (14) receives an input voltage level (16) and provides a resulting output voltage level (18) as an output therefrom to operate the viewer device (D). The electrical interface circuit (14) is adapted to receive a selected first input voltage level (20) from the first battery pack (12). The electrical interface circuit (14) is adapted to alternatively receive a selected second input voltage level (22) from a power supply source (S) external to the battery pack housing (10). such as from an aircraft power supply. The electrical interface circuit (14) further includes a switch (24) for selecting between sources of input voltage levels (16) from among at least the first input voltage level (20) from the first battery pack (12) and an off state. Providing an input from the second input voltage level (22) from the power supply source (S) that is external to the battery pack housing assembly (10) would preferably activate the interface circuit (14) to override the batteries (12). The switch (24) also is used to effectively control the source for the resulting output voltage level (18) from the battery pack housing assembly (10) and being provided by the transportable power supply (P).

Preferably, the battery pack housing assembly (10) is adapted to conform to an exterior surface (28) of a helmet (26), such as a military aviator's or other ballistic impact protection types of helmets. A first support member (30) mounted or formed with an exterior surface (32) of the battery pack housing (10) may also be included for attaching the battery pack housing assembly (10) to a complementary second support member (34) affixed to the exterior surface (28) of the helmet (26).

Figure 4:
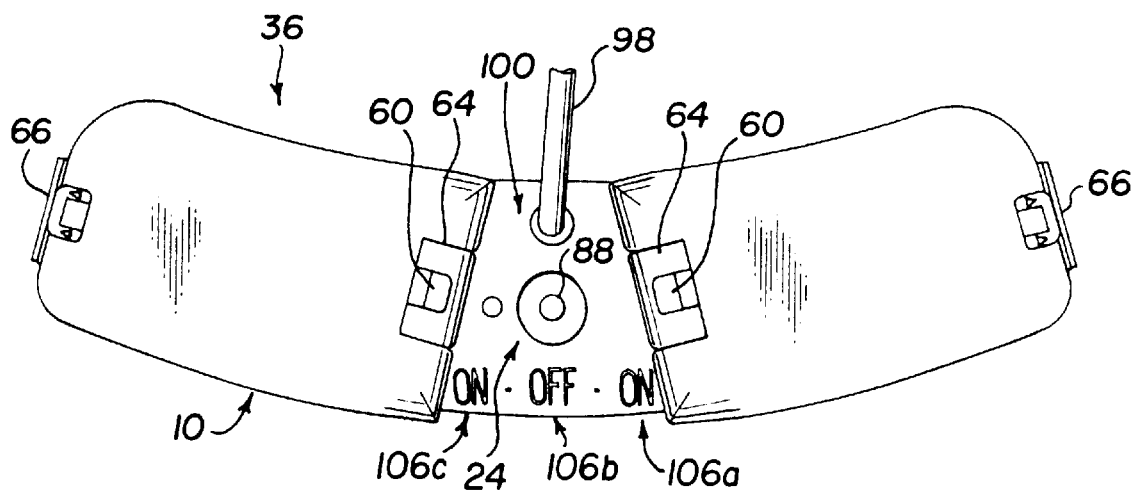
FIG. 4 is a top plan view.
Figure 5:
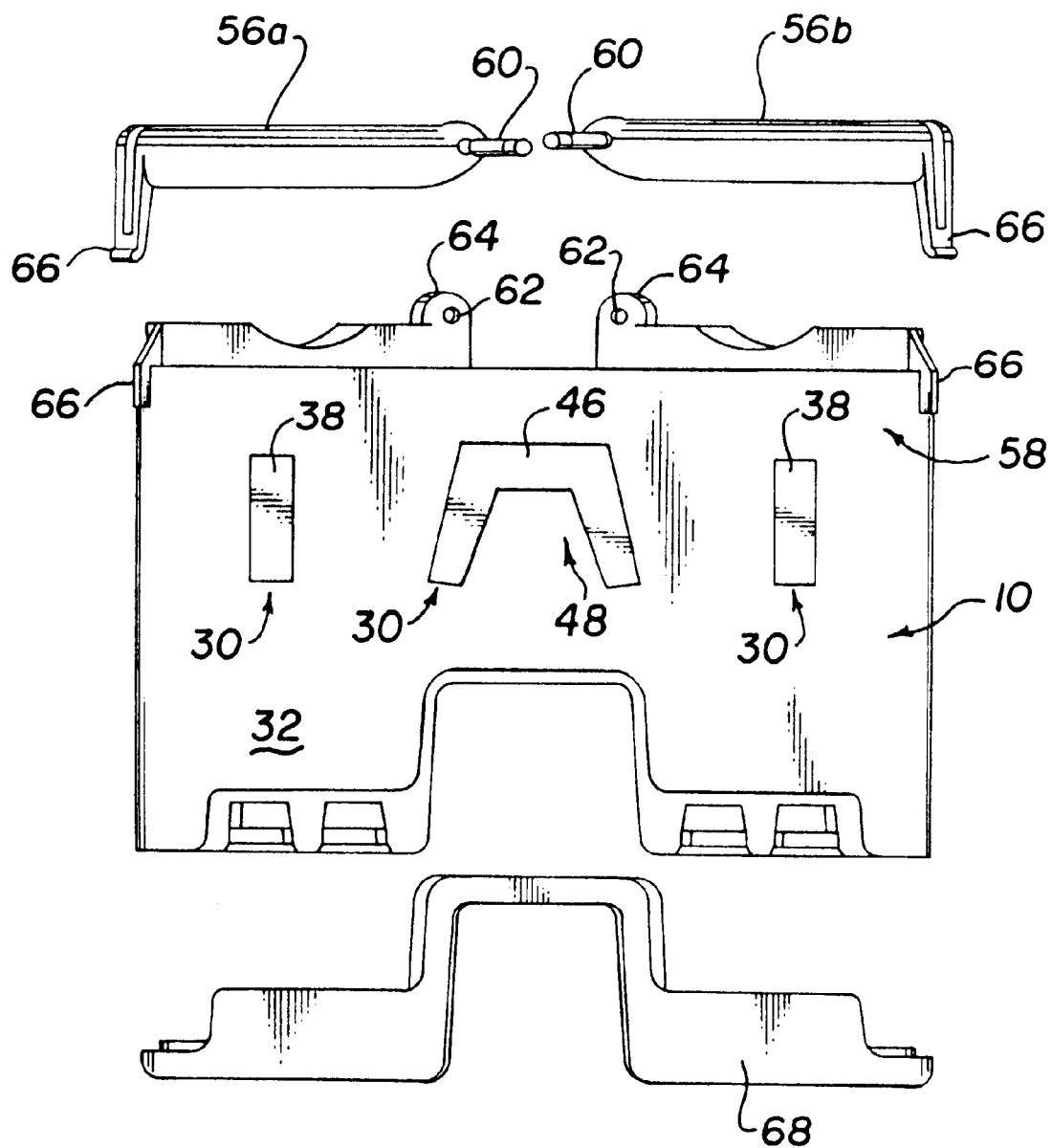
FIG. 5 is a rear view of the battery pack housing assembly.

FIG. 4 depicts that the rear facing exterior surface (36) has a curvature formed therein that is complementary to the curvature of the exterior surface (28) of the helmet (26) planned for use with the transportable battery pack (P).

In one alternative embodiment, the battery pack support system (30 and 34) includes a hook and loop type fastener with a first portion (38) of the hook and loop fastener mounted on an exterior surface (32) of the battery pack housing assembly (10) and a complementary second portion (40) of the hook and loop fastener mounted on the exterior surface (28) of the helmet (26).

In yet another alternative embodiment of the battery pack support system (30 and 34), the second support member (34) may be formed as a dovetail or tongue member (42) attached to the helmet exterior surface (28) with screws or rivets (44). In such an embodiment, the first support member (30) on the battery pack housing (10) would be a compatible receiving member (46) formed with or attached to the battery pack housing (10) and having a notch (48) formed therein to receive and secure the corresponding dovetail member (42). The first battery pack (12) may include a plurality of individual batteries (50), such as known AA or BA-5567 sized batteries or other comparable types of batteries, chosen to provide a source of power compatible with powering the selected viewer device (D). The battery pack housing assembly (10) optionally may further include an internally held second battery pack (52) having a third input voltage level (54). Similar to the first battery pack (12), the second battery pack (52) may include two or more individual batteries (50), depending on the design. Additional battery packs may be included similar to the second battery pack (52).

The first battery pack (12) and optional second battery pack (52) are desirably accessible through a removable cover (56) formed with the battery pack housing assembly (10). Each battery pack (12 and 52) may have their own removable cover (56) securing the battery pack. For instance, removable cover (56a) would secure separately the first battery pack (12) from the second battery pack (52) with its corresponding cover (56b).

The removable covers (56) may be pivotally mounted to the top (58) of the battery pack housing (10) with pins (60) cooperating with passages (62) formed through ears (64) attached to the top (58) of the battery pack housing (10). Latches (66) may also be used to secure the pivoted covers (56) to the top (58) of the housing (10).

The battery pack housing (10) may be formed having a removable bottom cover (68).

The image viewing device (D) may be a night vision device ("NVD"), fused sensor type of device, or any other compatible device for detecting or sensing images.

For a night vision device, often such a NVD device includes an image intensifier tube (70) or other example of an image intensifier.

The Electrical Circuit

The electrical interface circuit (14) desirably includes an input connector that is accessible externally to the battery pack housing assembly (10) for connecting the electrical interface circuit (14) to the second input voltage level (22) from the power supply source (S) external to the battery pack housing (10).

The electrical interface (14) preferably further includes an output connector that is accessible externally to the battery pack housing assembly for connecting the output voltage level from the electrical interface circuit (14) to the image viewer (D).

In one embodiment of the circuitry, the electrical interface (14) includes a low voltage indicator (80) to generate an indication when a low battery voltage level is detected by the voltage level detection circuit (82) and low battery indicator driver (84) electrically connected to detect a low battery condition.

The electrical interface (14) may further include one or more low pass filters (86) to assist in the regulation of the output voltage level (18).

If there is a second battery pack (52), the switch circuit (24) effectively acts to select input voltage levels (16) from between the first input voltage level (20) from the first battery pack (12), the second input voltage level (22) from the power supply source (S) external to the battery pack housing (10), and a third input voltage level (54) from the second battery pack (52).

As is shown in the electrical block diagram of FIG. 6, the switching circuit (24) optionally includes a mechanical battery select switch (88) that is often a known two or three position mechanical type electrically combined and connected with a transistor type of switching circuit (90) and an external voltage enable switching circuit (91).

For a mechanical switch (88) having three positions, the first position could be the center position, which would be an "off" state for both the internal batteries and the external aircraft power. The other two positions are left and right of the center position, and turn "on" one set of batteries (either primary (12) or secondary (52)) depending on the position. If aircraft or external power (22) is applied, then switching circuit (90) of the interface circuit (24) overrides the batteries (either primary (12) or secondary (52)), and the batteries have comparatively little load. If aircraft power is removed, that is the connector (104) is unplugged, or there is no aircraft power (22), then the batteries selected by the mechanical switch (88) position will power the night vision device (D).

A feedback circuit (92) may also be included in the electrical interface (14) to provide a signal to the external power supply (S). A low pass filter (86a) and a power control circuit (94) electrically connected to the transistor switching circuit (90) combine to provide the feedback signal input to the external power supply (S).

Known fuses (96) may be included in the electrical interface circuit (14) to minimize damage to the electrical components by power level fluctuations.

In the preferred embodiment, a cable (98) extends between a coupling (100) adapted to connect the cable (98) to the output of the interface circuit (14) and the viewer device (D). Similarly, another cable (102) extends between and electrically connects the external power supply (S) and a coupling (104) adapted to connect the cable (102) to an input of the interface circuit (14) for the switch circuit (24).

The couplings (100 or 104) can be chosen to be of a quick disconnect type for instances in which the operator or wearer must rapidly disconnect, such as in a situation in which the wearer is a pilot during an ejection sequence.

The coupling (104) is located within a notch (120) or cutout area formed in the bottom (122) of the housing assembly opposite that of the top (58). The placement of the coupling (104) within the notch area (120) protects the connector such that there is a much less likelihood of damaging the connector by bumping an adjacent structure. The downward pointing direction of the connector (104) optimizes the disconnect sequence during a pilot's ejection from a cockpit, which generally occurs straight up with a typical ejection seat in a high performance aircraft.

Optionally, the top (58) of the housing (10) may be marked with indicia (106) to indicate separate operating positions for the first battery pack position (106a), the external poser source position (106b), and the second battery pack position (106c).

The foregoing disclosure and description of the invention are illustrative and explanatory thereof, and various changes in the size, shape and materials, as well as in the details of the illustrated construction may be made without departing from the spirit of the invention.

What is claimed is:

1. A transportable power source for an image viewing type device comprising:

a battery pack housing assembly to internally hold at least a first battery pack;

electrical interface circuitry means for receiving an input voltage level and providing a resulting output voltage level as an output therefrom to operate the viewer device;

said electrical interface circuitry adapted to receive a selected first input voltage level from said first battery pack;

said electrical interface circuit adapted to receive a selected second input voltage level from a power supply source external to said battery pack housing; and said electrical interface circuit further includes a switching circuit means for selecting between sources of input voltage levels from among at least the first input voltage level from said battery pack and the second input voltage level from the power supply source external to said battery pack housing, and to selectively control the source for the resulting output voltage level.

2. The invention of claim 1 further including an internally held second battery pack having a third input voltage level.

3. The invention of claim 2 wherein said switching circuit selects input voltage levels from between the first input voltage level from the first battery pack, and the third input voltage level from the second battery pack, or the second input voltage level from the power supply source external to the battery pack housing.

4. The invention of claim 1 wherein the battery pack housing assembly is adapted to conform to an exterior surface of a helmet.

5. The invention of claim 4 further including support means for attaching the battery pack housing assembly to the exterior surface of the helmet.

6. The invention of claim 5 wherein the support means includes a hook and loop type fastener with one portion of the hook and loop fastener mounted on an exterior surface of the battery pack housing assembly and a complementary portion of the fastener mounted on the exterior surface of the helmet.

7. The invention of claim 1 wherein the image viewing device is a night vision device.

8. The invention of claim 7 wherein the night vision device includes an image intensifier.

9. The invention of claim 1 wherein said electrical interface further includes an output connector that is accessible externally to the battery pack housing assembly for connecting the output voltage level from the electrical interface circuit to the image viewer.

10. The invention of claim 1 wherein said electrical interface further includes a low voltage indicator to generate an indication when a low battery voltage level is detected.

11. The invention of claim 1 wherein said first battery pack includes a plurality of individual batteries.

12. The invention of claim 1 wherein said first battery pack is accessible through a removable cover formed with the battery pack housing assembly.

13. The invention of claim 1 wherein said electrical interface further includes a low pass filter to assist in the regulation of the output voltage level.

* * * * *